US008312105B2

(12) United States Patent
Abernethy, Jr. et al.

(10) Patent No.: US 8,312,105 B2
(45) Date of Patent: Nov. 13, 2012

(54) NATURAL ORDERING IN A GRAPHICAL USER INTERFACE

(75) Inventors: Michael N. Abernethy, Jr., Pflugerville, TX (US); Travis M. Grigsby, Austin, TX (US); Jacob L. Moilanen, Austin, TX (US); Nazgol Sedghi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 12/431,732

(22) Filed: Apr. 28, 2009

(65) Prior Publication Data
US 2010/0274851 A1 Oct. 28, 2010

(51) Int. Cl.
*G06F 15/16* (2006.01)
(52) U.S. Cl. ........ 709/217; 709/203; 709/218; 709/219; 707/751; 707/752; 707/753; 707/754; 715/212; 715/213; 715/229; 715/234; 715/760
(58) Field of Classification Search .................. None
See application file for complete search history.

(56) References Cited

U.S. PATENT DOCUMENTS

| | | | | |
|---|---|---|---|---|
| 5,586,039 A | * | 12/1996 | Hirsch et al. | 700/95 |
| 5,613,057 A | * | 3/1997 | Caravel | 715/204 |
| 5,668,960 A | * | 9/1997 | Kataoka | 345/637 |
| 5,991,756 A | * | 11/1999 | Wu | 707/706 |
| 6,557,004 B1 | * | 4/2003 | Ben-Shachar et al. | 707/706 |
| 6,580,440 B1 | * | 6/2003 | Wagner et al. | 715/762 |
| 6,826,577 B1 | * | 11/2004 | Maruyama et al. | 1/1 |
| 7,023,440 B1 | * | 4/2006 | Havekost et al. | 345/440 |
| 7,155,665 B1 | * | 12/2006 | Browne et al. | 715/243 |
| 7,162,471 B1 | * | 1/2007 | Knight et al. | 707/750 |
| 7,831,602 B2 | * | 11/2010 | Veit | 707/752 |
| 7,890,520 B2 | * | 2/2011 | Tsukazaki et al. | 707/754 |
| 7,904,464 B2 | * | 3/2011 | Golwalkar et al. | 707/752 |
| 8,001,089 B2 | * | 8/2011 | Tabellion et al. | 707/674 |
| 2002/0091728 A1 | * | 7/2002 | Kjaer et al. | 707/503 |
| 2003/0097361 A1 | * | 5/2003 | Huang et al. | 707/10 |
| 2004/0194016 A1 | * | 9/2004 | Liggitt | 715/501.1 |
| 2007/0088723 A1 | * | 4/2007 | Fish | 707/100 |
| 2007/0143667 A1 | | 6/2007 | Deaton et al. | |
| 2007/0174257 A1 | * | 7/2007 | Howard | 707/3 |
| 2007/0179967 A1 | * | 8/2007 | Zhang | 707/102 |
| 2007/0239697 A1 | | 10/2007 | Chen et al. | |
| 2008/0166106 A1 | * | 7/2008 | Ozawa et al. | 386/124 |

(Continued)

OTHER PUBLICATIONS

Wikipedia, Server, pp. 1-5.*

*Primary Examiner* — Backhean Tiv
(74) *Attorney, Agent, or Firm* — DeLizio Gilliam, PLLC

(57) ABSTRACT

Provided is a method for displaying information such as lists of data, files and icons in a window of a graphical user interface (GUI). Unlike a typical display methodology, which arranges items in a "machine-dependent" sorting order, the disclosed technology provides a "natural" sorting order. The list, or names associated with the files or icons are incorporated into a query and the query is transmitted to a web service. The web service parses the query to determine a natural order appropriate to the material represented by the list, files, or icons rearranges the list, files or icons into the natural order and returns a response to the originator of the query. The operating system or GUI that originated the query receives the response, parses the response and displays the list, files or icons in the corresponding natural order.

20 Claims, 6 Drawing Sheets

U.S. PATENT DOCUMENTS

2008/0189099 A1* 8/2008 Friedman et al. .................. 704/8
2008/0256454 A1* 10/2008 Latzina et al. ................. 715/732
2009/0024915 A1* 1/2009 Cudich et al. ................. 715/234
2009/0113282 A1* 4/2009 Schultz et al. ................. 715/208
2010/0245259 A1* 9/2010 Bairagi et al. ................. 345/173
2010/0274851 A1* 10/2010 Abernethy et al. ........... 709/204

* cited by examiner

NATURAL ORDERING IN A GRAPHICAL USER INTERFACE

BACKGROUND

1. Technical Field

The claimed subject matter relates generally to computing systems and, more specifically, to a method for ordering items displayed in a graphical user interface (GUI).

2. Description of the Related Art

When computers were first invented, instructions, or programs, and data were entered manually via a series of switches. Soon, program and data entry was performed either by means of punch cards or keyboards coupled to the computing devices. Certainly, one of the primary advances in the computing arts has been the introduction of the graphical user interface (GUI). A GUI enables a user to enter data and commands and to execute programs by means of a keyboard and a computer mouse. In addition, a GUI enables a user to display information, generated by many types of programs, on a computer screen in a variety of formats, depending upon the needs of the user.

The Windows operating system (OS), published by the Microsoft Corporation of Redmond, Wash., is one example of a GUI that enables users to display information from different types of programs in a variety of formats. Some types of programs that display information include, but are not limited to, word processing programs and spreadsheets. In Windows, a display, or "desktop," includes icons for programs that are either executing or may be executed and graphical displays, or "windows," for programs that are active. Individual files associated with a particular program may also be displayed as icons and lists within a window.

Lists of information, files and icons displayed in conjunction with a particular application are typically arranged is some order that is determined by an underlying computer measurement. For example, a list of data, files in a directory or icons in a window may be sorted alphabetically, by name, by type, size or a date and time such as the data and time each item in the list, file or icon was last accessed or modified. The underlying computer measurements corresponding to a sorting scheme may not be a natural or intuitive method for a user, particularly a user who is not an experienced computer user.

SUMMARY OF THE CLAIMED SUBJECT MATTER

Provided is a method for displaying a list of data, files and icons in a window of a graphical user interface (GUI). Unlike a typical display methodology, which arranges items in a "machine-dependent" sorting order, the disclosed technology provides a "natural" sorting order based upon a context and implicit information associated with each file, icon or item in the list. For example, an accounting department that creates a new spreadsheet every month to track costs would naturally name the files based upon the months of the year, i.e. "January", "February" and so on. Typical sorting methods for files includes alphabetically by file name, by file type, size or a date and time such as the data and time each file or icon was last accessed or modified and none of these machine-dependent sorting methods is of much help to a typical computer user. Alphabetically, the files would be listed as "April ", "August" and so on. The size of the file is irrelevant to any natural understanding of the relationship among the files and sorting by last accessed or modified date is useless because the March file could have been corrected after the February file was finalized.

A natural ordering scheme addresses these issues. The list of data items, file names or icon identifiers are incorporated into a query and the query is transmitted to a web service. The web service parses the query, determines a context based upon such factors as names and types of files the materials in the list or typically stored in the documents or files associated with the query, selects a "natural" order appropriate to the context, rearranges the list of data, names of the icons or files into the natural order and returns a response, including a list of the sorted file or icons, to the originator of the query. The operating system or GUI that originated the query receives the response, parses the response and displays the icons or files in the corresponding natural order.

The disclosed technology provides an artificial intelligence capability to the display of information in a window or GUI. Ordering schemes may be prearranged by a user and stored by the web service. The technology may be integrated into a GUI and initiated by the selection of a "Sort by→Natural Order" selection on a menu provided by the GUI. In addition to files and icons, the disclosed technology may be employed to sort a display of items in any list. For example, a list of military ranks, such as "general," lieutenant," "corporal," and so on is transmitted to the web service. Intelligence, or logic associated with the web service, determines that the list references military ranks and sorts the list accordingly based upon stored configuration information. Currently, sorting schemes related to such material is limited to alphabetical order.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

Although described with particular reference to a window based computer display, the claimed subject matter can be implemented in any information technology (IT) system in which a user friendly, or natural, display of data, computer icons and files is desirable. Those with skill in the computing arts will recognize that the disclosed embodiments have relevance to a wide variety of computing environments in addition to those described below. In addition, the methods of the disclosed technology can be implemented in software, hardware, or a combination of software and hardware. The hardware portion can be implemented using specialized logic, the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for the ordering and display of computer files. The term "programmed method", as used herein, is defined to mean one or more process steps that are presently performed: or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
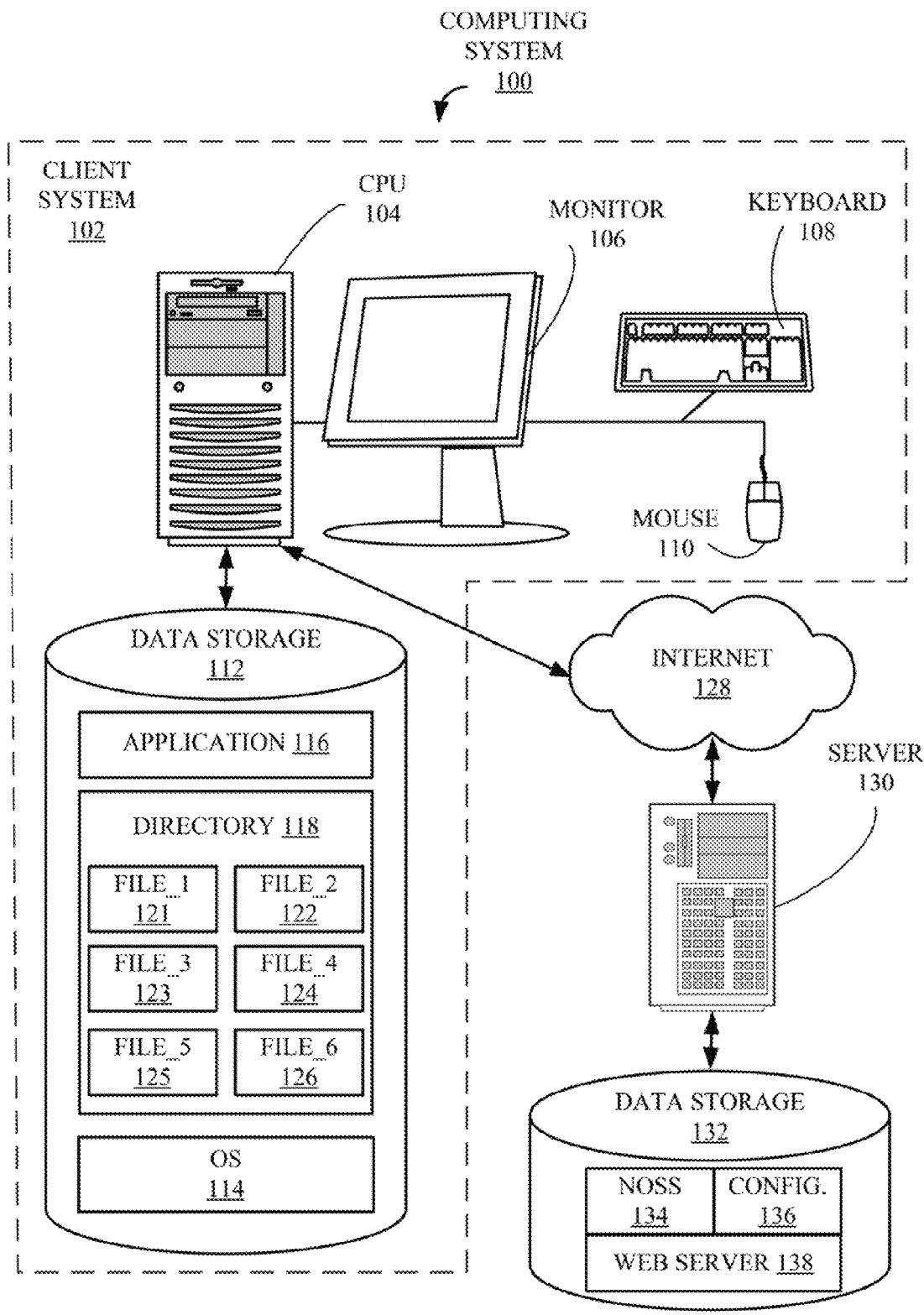
FIG. 1 is a block diagram of one example of a computing system architecture that incorporates the claimed subject matter.

Turning now to the figures, FIG. 1 is a block diagram of one example of a computing system architecture 100 that incorporates the claimed subject matter. A client system 102 includes a central processing unit (CPU) 104, coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing an operating system (OS) 114 that controls the operation of client system 102 and an application 116. In the following examples, application 116 is a file display and search utility such as Microsoft Explorer, published by the Microsoft Corporation of Redmond Wash. In should be noted that the disclosed technology applies to may types of applications but for the sake of simplicity only one type, i.e. a file display and search application, is illustrated. Data storage 112 is illustrated storing a directory structure 118, which includes several files, i.e. a file_1 121, file_2 122, a file_3 123, a file_4 124, a file_5 125 and file_6 126. Application 116, directory 118 and files 121-126 are used throughout the Specification for illustrative purposes.

Client system 102 and CPU 104 are connected to the Internet 128, which is also connected to a server computer 130. Although in this example, CPU 104 and server 130 are communicatively coupled via the Internet 128, they could also be coupled through any number of communication mediums such as, but not limited to, a local area network (LAN) (not shown). Like client system 102, server 130 is coupled to a data storage 132, which may either be incorporated into server 130, i.e. an internal device, or attached externally to server 130 by means of various, commonly available connection devices such as but not limited to, a universal serial bus (USB) port (not shown). In this example, data storage 132 is storing a Natural Order Sort System (NOSS) 134 and a corresponding configuration module ("config.") 136, which together implement the claimed subject matter. NOSS 134 and configuration module 136 are described in more detail below in conjunction with FIGS. 2-5. NOSS 138 and configuration module 136 are coupled to a web service engine 138 that provides the functionality of NOSS 134 as a service to clients, such as a user on client system 102, via the Internet 128. In an alternative embodiment, functionality associated with NOSS 138 is implemented on client system 102 and the associated logic is stored on data storage 112 and executed on CPU 104.

Application 116, directory 118, files 121-126 and web service 138 are used throughout the Specification for illustrative purposes. It should be noted there are many possible computing system configurations, of which computing system 100 is only one simple example.

Figure 2:
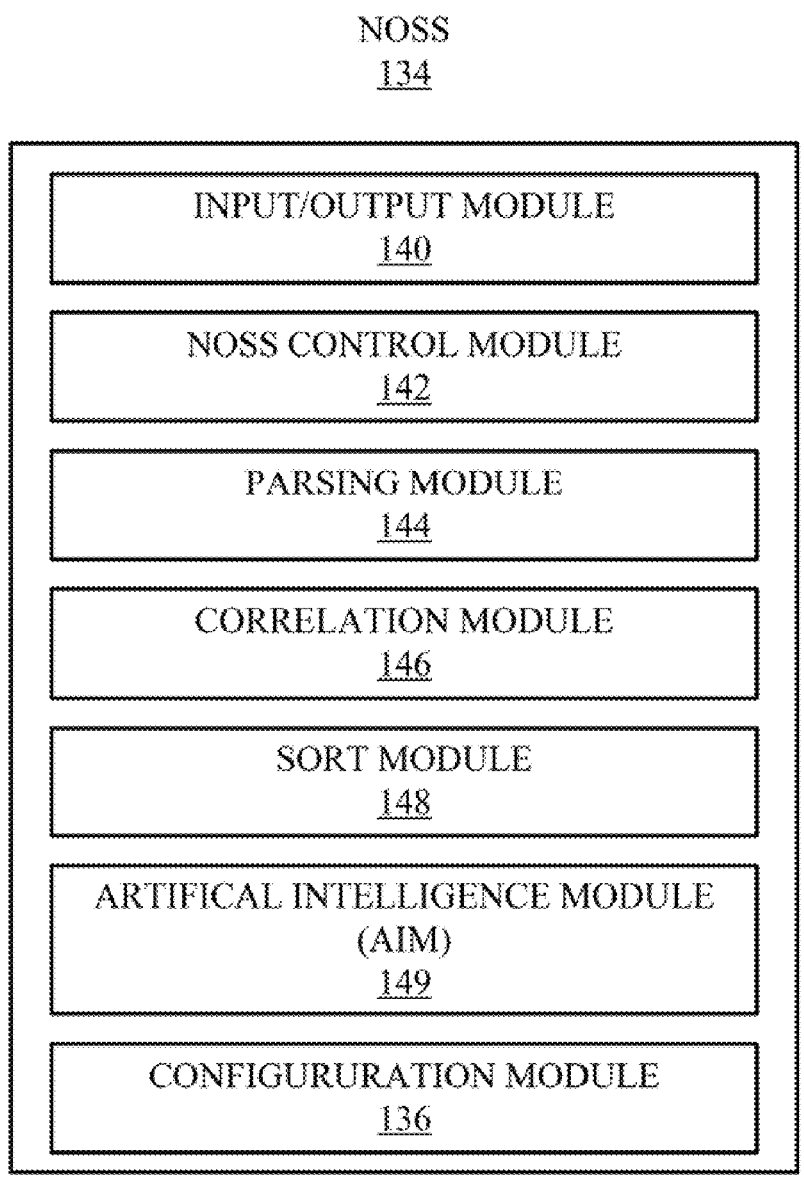
FIG. 2 is a block diagram of a Natural Order Service System (NOSS), first introduced above in conjunction with FIG. 1.

FIG. 2 is a block diagram of NOSS 134, first introduced above in conjunction with FIG. 1, in more detail showing various components, including configuration module 136. NOSS 134 also includes an Input/Output (I/O) module 140, a NOSS control module 142, a parsing module 144, a correlation module 146 and a sort module 148. Configuration module 136 stores information that controls the operation of NOSS 134. This information includes, but is not limited to, sort preferences and setups for particular users (not shown) and/or computing systems, such as client system 102 (FIG. 1).

I/O module 140 handles any communication NOSS 134 has with other components of system 100 (FIG. 1), primarily via web service 138 (FIG. 1). NOSS control module 142 controls the operation of NOSS 134, specifically implementing the setup of NOSS 134 (see process 200, FIG. 5) and coordinating the execution of I/O module 140, parsing module 144 correlation module 146 and sort module 148.

Parsing module 144 receives requests via I/O module 140 and interprets each request to enable NOSS 134 and components 140, 142, 146 and 148 to service the requests. Correlation module 146 associates each request received via I/O module 140 and parsed by module 144 to a particular client system, such as client system 102 and/or a particular user (not shown) on the particular client system. Based upon results produced by correlation module 146 and information stored in configuration module 136 and associated with a user and/or client system, sort module 148 determines a display order for lists of files, such as files 121-124 (FIG. 1) that are listed in the received message. Modules 136, 140, 142, 144, 146 and 148 are described in more detail below in conjunction with FIGS. 3-6.

Figure 3:
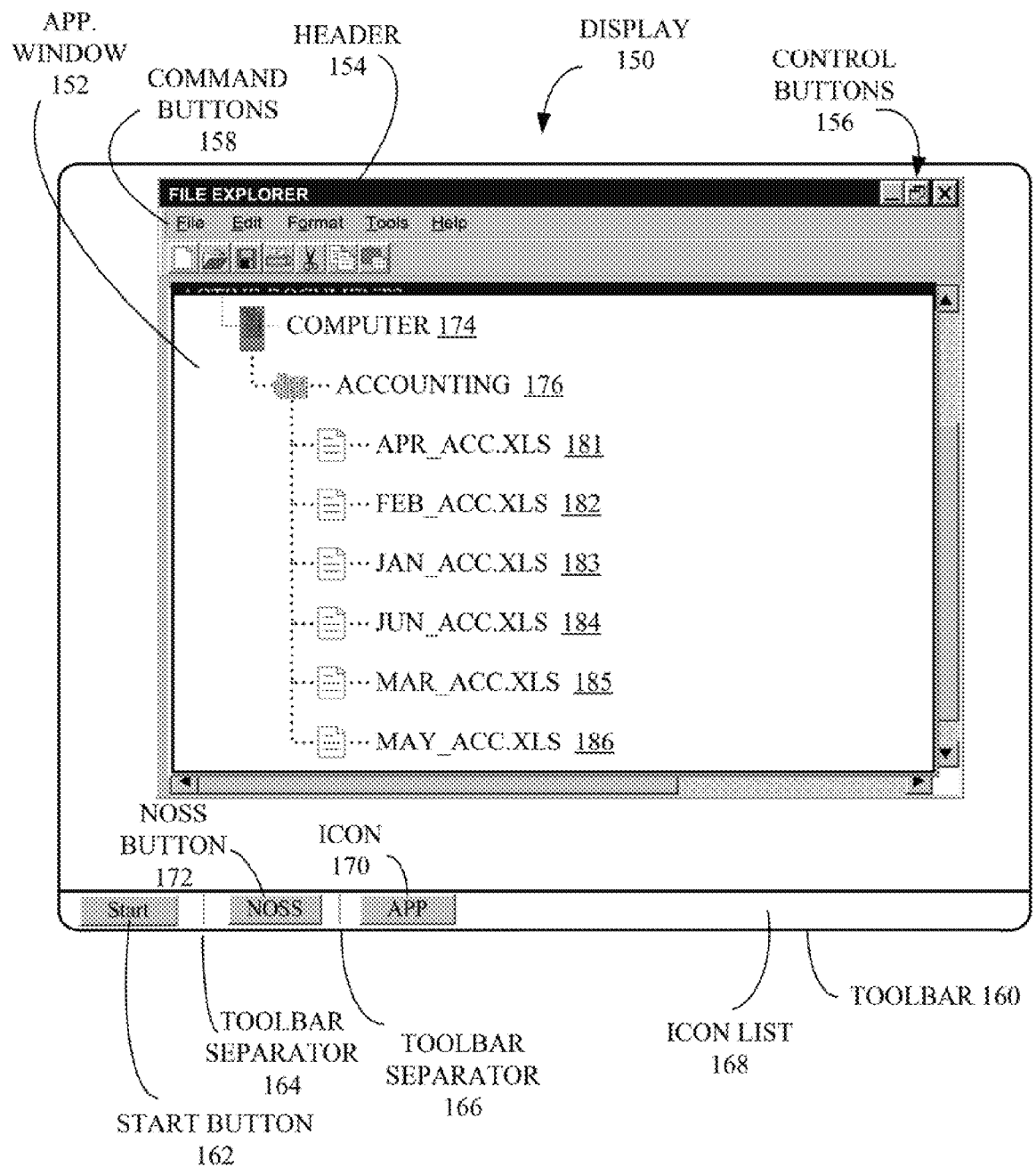
FIG. 3 is an illustration of a display that demonstrates the functionality of the claimed subject matter.

FIG. 3 is an illustration of a display 150 that demonstrates the functionality of the claimed subject matter. In this example, display 150 is viewed on monitor 106 (FIG. 1) of client system 102 (FIG. 1) and generated by application 116 (FIG. 1) in conjunction with a graphical user interface (GUI) (not shown) associated with OS 114 (FIG. 1). Application 116 is generating an application (app.) window 152 that includes a header 154 and control buttons 156. Header 154 shows the name of application 116, i.e. "File Explorer." Control buttons 156 enable a user to terminate execution of application 116 and maximize or minimize window 152. Manipulation of window 152 by control buttons 156 is exercised when the user positions a cursor (not shown) over a particular icon and presses, or "clicks," a button (not shown) on mouse 110 (FIG. 1). Command buttons 158 provide access to various drop-down menus (see FIG. 4) and include a "File" button, an "Edit" button, a "Format" button, a "Tools" button and a "Help" button.

A toolbar 160 extends along the bottom of display 150 from the left edge to the right edge of the screen associated monitor 106. Within toolbar 160 are a "Start" button 162 and toolbar separators 164 and 166. To the right of toolbar separator 166 is an icon list area 168. Icon list 168 displays icons that indicate the corresponding applications or utilities that are currently loaded and executing on CPU 104 (FIG. 1). Included in this example are an example of an icon 170, corresponding to application 116 and application window 152. Tool bar 160 also includes a Natural Order Sort System (NOSS) button 172. NOSS button 172 provides the means for a user to execute NOSS 134 (FIG. 1), either on web server 138 (FIG. 1) or client system 102 depending upon the particular configuration, in conjunction with application 116 and window 152.

Those with skill in the computing arts should be familiar with control buttons, command buttons, toolbars, start buttons, icons and icon areas as well as the use of a mouse and cursor to initiate actions on client system 102. Further, it should be understood that icons are sometimes referred to as "buttons" in that actions occur when icons are clicked in much the same way that actions occur when physical buttons, such as those on mouse 110, are pressed.

Displayed in window 152 in conjunction with application 116 is a file tree beginning at a computer icon 174 representing client system 102. The file tree represents accounting files stored on data storage 112 (FIG. 1). Stored in a hierarchy on data storage 112 is an Accounting folder, or directory, 176, and stored within directory 176 are several files, i.e. an apr_acc.xls file 181, a feb_acc.xls file 182, a jan_acc.xls file 183, a jun_acc.xls file 184, a mar_acc.xls file 185 and a may_acc.xls file 186. In this example, accounting icon 176 represents directory 118 (FIG. 1) and files icons 181-186 represent file _1 121, file _2 122, file _3 123, file _4 124, file _5 125 and file _6 126, respectively, all introduced above in conjunction with FIG. 1.

It should be noted that file icons 181-186 are displayed in alphabetical order, which is a scheme commonly employed in file display applications such as application 116. In this example, apr_acc.xls file 181 represents accounting data corresponding to the month of April, feb_acc.xls file 182 represents accounting data corresponding to the month of February, jan_acc.xls file 183 represents accounting data corresponding to the month of January, jun_acc.xls file 184 represents accounting data corresponding to the month of June, mar_acc.xls file 185 represents accounting data corresponding to the month of March and may_acc.xls file 186 represents accounting data corresponding to the month of May. In other words, this display scheme, which is commonly employed to sort files in such a list, does not accurately represent the manner in which humans would expect to see such data, i.e. sorted in chronological order by the month represented by the data. Other commonly available sorting schemes such as but not limited to, time of file creation, time of file modification and time of last file access, which do not take into account either the type of file or data associated with each file, also do not accurately represent a "natural" sorting order. One issue with each of the commonly available sorting schemes is that they depend upon data that a computing system such as client system 102 stores in conjunction with each file.

Figure 4:
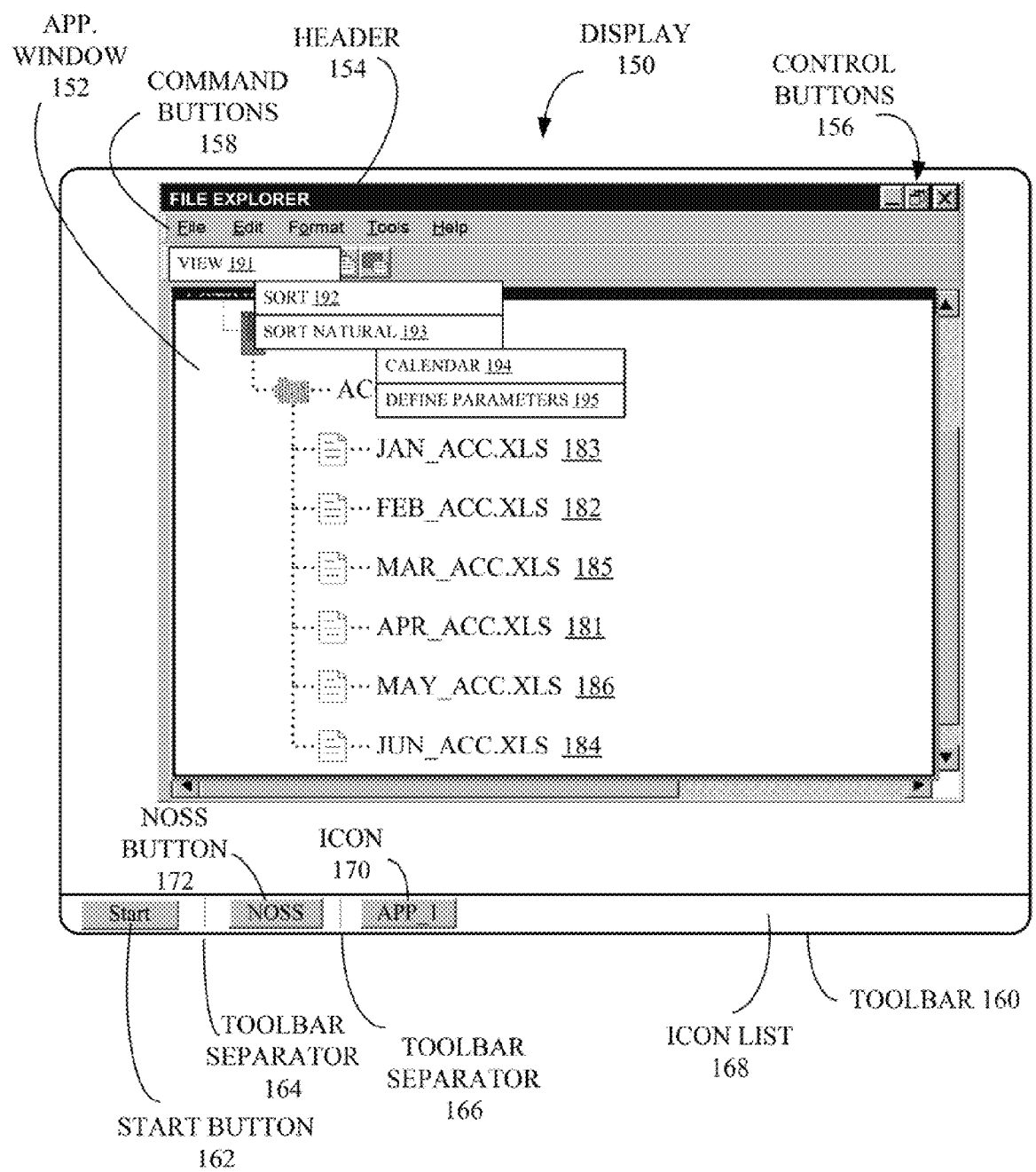
FIG. 4 is an illustration of the display, first introduced in FIG. 1, demonstrating a result of an execution of the claimed subject matter.

FIG. 4 illustrates display 150, first introduced in FIG. 1, demonstrating a result of an execution of the claimed subject matter. Like shown in FIG. 3, window 150 includes application window 152, header 154, control buttons 156, command buttons, 158, toolbar 160, start button 162, toolbar separators 164 and 166, icon list 168, icon button 170, NOSS button 172 and file icons 181-186. In addition, FIG. 4 includes several drop down menus under the "File" option of command buttons 158, specifically, a "View" option 191, a "Sort" option 192, a "Sort Natural" option 193, a "Calendar" option 194 and a "Define Parameters" option 195. Those with skill in the computing arts should be familiar with drop down menus and the inherent hierarchy of the specific options 191-195.

In this example, file icons 181-186 have been reordered as though a user has clicked, in sequence, on File command button 158, View 191, Sort Natural 193 and Calendar 194. Clicking in order on options 191, 193 and 194 has initiated execution of NOSS 134 (FIGS. 1 and 2) with respect to Accounting directory 176 (FIG. 3) (obscured in FIG. 4 by drop down menus 191-194) to rearrange files 181-186 in the natural chronological order of January 183, February 182, March 185, April 181, May 186 and June 184. In other words, Calendar drop down 194 is a selection to reorder files 181-186 in a natural calendar order rather than the default alphabetical order illustrated in FIG. 3. Selection of a drop-down option causes a message to be generated for transmission to NOSS 134 (see block 254, FIG. 6). The message includes information related to the directory displayed in window 150 and from which the selection is generated. The same actions may also be initiated by a click on NOSS button 172. It should be noted that there is typically nothing in metadata associated with either files 121-126 (FIG. 1) or corresponding file icons 181-186 that enables OS (FIG. 1) to determine this particular "natural" order. Dates associated with file creation, modification, last access or alphabetical orders to not correspond to the ordering illustrated in FIG. 4. As explained above in conjunction with FIG. 2, the ordering is stored in configuration module 136 of NOSS 134. Examples of processes for implementing this technology is explained in more detail below in conjunction with FIGS. 5 and 6.

User selection of Define Parameters option 195 displays a graphical user interface (GUI) (not shown) that enables the user to define the parameters employed in particular under Sort Natural option 193. For example, a user may add metadata to each particular file that controls the reordering of files in a directory. Further, a user may define a specific field within each file of a particular directory that is to be employed in a reordering scheme. In the example of a Calendar scheme represented by Calendar option 194.

Figure 5:
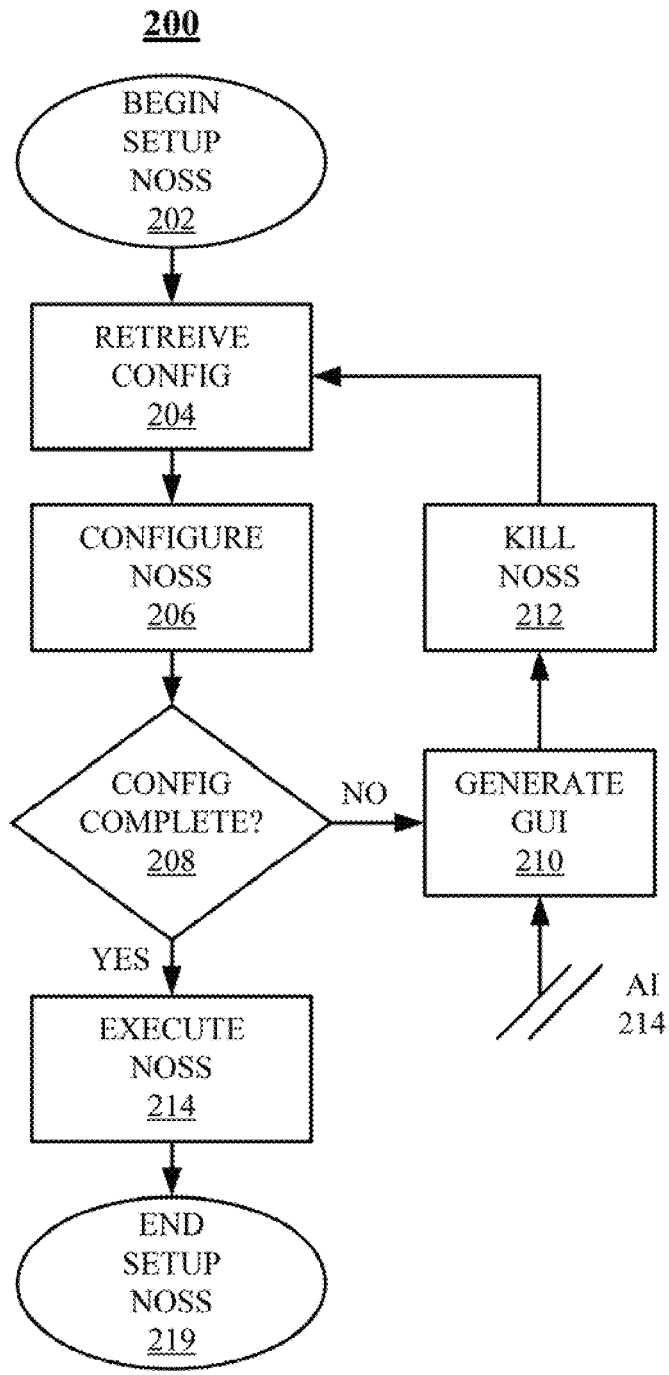
FIG. 5 is a flowchart of a Setup NOSS process that implements one aspect of the claimed subject matter.

FIG. 5 is a flowchart of logic corresponding to a Setup NOSS process 200 that implements one aspect of the claimed subject matter. In this example, process 200 is stored on data storage 132 (FIG. 1) and executed on server 130 (FIG. 1) in conjunction with web service 138. In an alternative embodiment, process 200 and NOSS 134 could be stored on data storage 112 (FIG. 1) and executed on CPU 104 (FIG. 1) as a stand-alone utility, a plug-in associated with an application such as application 116 (FIG. 1) or as part of OS 114 (FIG. 1).

Process 200 starts in a "Begin Setup NOSS" block 202 and proceeds immediately to a "Retrieve Configuration (Config.)" block 204. During block 204, process 200 retrieves configuration data from configuration module 136 (FIGS. 1 and 2). As explained above in conjunction with FIG. 2, configuration data 136 includes but is not limited to, sort preferences and setups for particular users (not shown) and/or computing systems, such as client system 102 (FIG. 1). Sort preferences may be stored as metadata in conjunction with particular files such as files 121-126 (FIG. 1). For example, each of files 121 may include a "NOSS" metadata field that specifies a particular order in a user-preferred sequence. In the alternative, a sort order may be defined on a directory-by-directory basis by storing, in configuration data 136, information that associates a particular directory to a specific data field in each file within the directory. The specific data field may be a metadata field, information already existing in each file or information explicitly added to each file to implement the claimed technology.

During a "Configure NOSS" block 206, process 200 sets up internal data structures within NOSS 134 for use during execution. These data structures include the information from configuration data 136 retrieved during block 204 and include data on directories, files and systems that may employ NOSS 134. During a "Configuration (Config.) Complete?" block 208, process 200 determines whether or not the data retrieved during block 204 is complete or if the user has indicated during the initiation of NOSS 134 that further configuration is desired. If data 136 is not complete or the user has indicated an intention to add or modify data 136, process 200 proceeds to a "Generate GUI" block 210. During block 210, a GUI (not shown) is displayed on monitor 106 (FIG. 1) display current configuration data and enables the user to delete, modify or add to the associations between directories and files related to preferred sort techniques. Once the user has reconfigured data 136, process 200 proceeds to a "Kill NOSS" block 212 during which, if NOSS 134 is already executing in an operation mode (see FIG. 6), execution of NOSS 134 is halted and control returns to block 204 and processing continues as described above.

Block 210 may also be entered via an asynchronous interrupt (AI) 214 that is generated in response to user input such as a predefined sequence of key strokes on keyboard 104 (FIG. 1) once NOSS 134 is in a operation mode. One method of generating AI 214 is selection of Define Parameters option 195 (FIG. 4). The setup of the specific user input that initiates AI 214 is stored in configuration data 136 and may be defined with the GUI generated during block 210.

If during block 208, process 200 determines that configuration is complete, control proceeds to an "Execute NOSS" block 214 during which an Operate NOSS process 250 (see FIG. 6) is initiated. Finally, control proceeds to an "End Setup NOSS" block 219 in which process 200 is complete.

Figure 6:
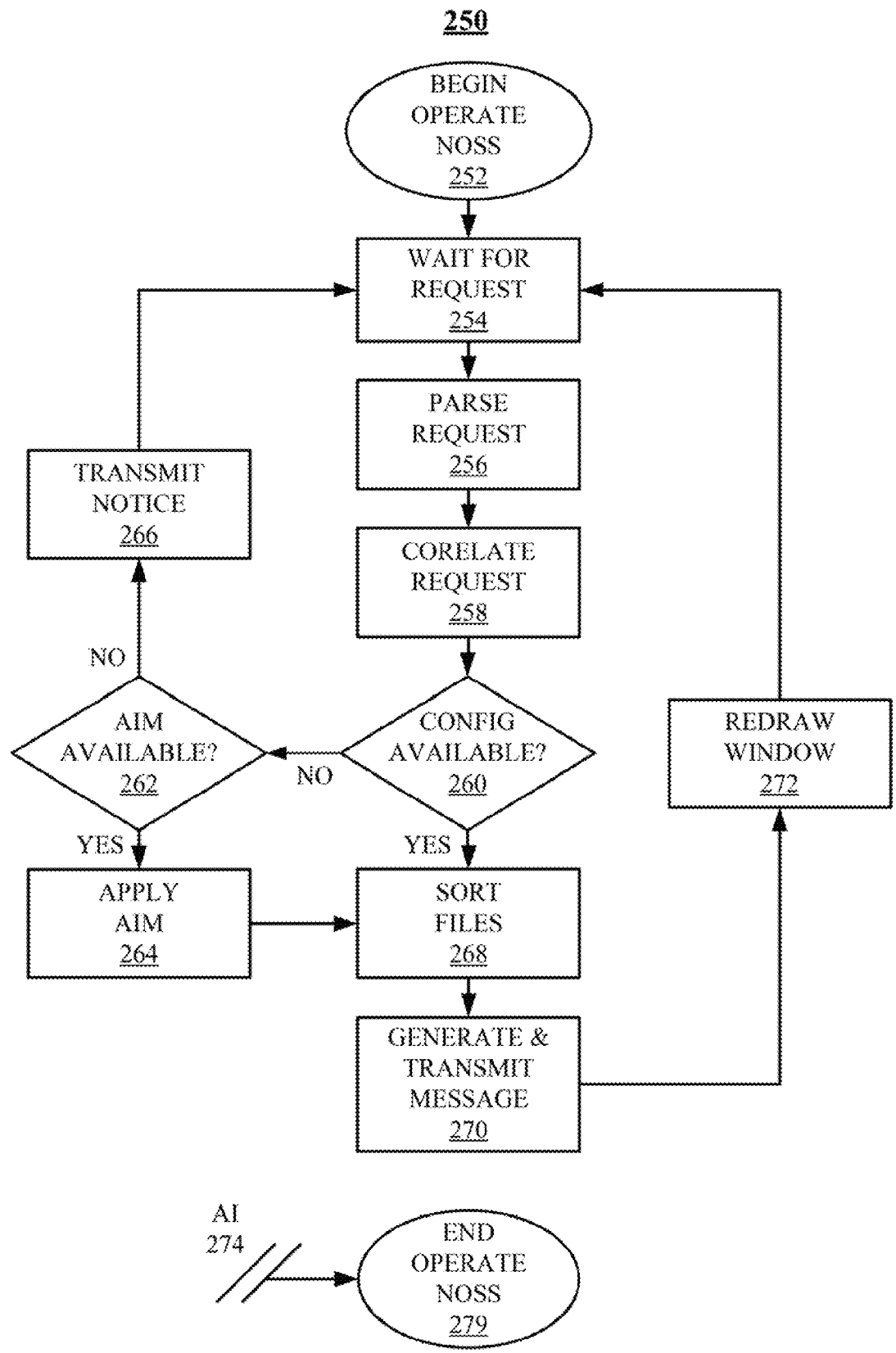
FIG. 6 is a flowchart of an Operate NOSS process that implements one embodiment of the claimed subject matter.

FIG. 6 is a flowchart of logic associated with an Operate NOSS process 250 that implements one embodiment of the claimed subject matter. Like process 200 (FIG. 5), in this example, process 250 is stored on data storage 132 (FIG. 1) and executed on server 130 (FIG. 1) in conjunction with web service 138, except as otherwise noted. In an alternative embodiment, process 250 and NOSS 134 could be stored on data storage 112 (FIG. 1) and executed on CPU 104 (FIG. 1) as a stand-alone utility, a plug-in associated with an application such as application 116 (FIG. 1) or as part of OS 114 (FIG. 1).

Process 250 starts in a "Begin Operate NOSS" block 252 and proceeds immediately to a "Wait for Request" block 254. During block 254, process 250 is suspended while waiting for a request from a user to implement the claimed subject matter with respect to a particular display. In this example, the request is generated on client machine 102 (FIG. 1) in conjunction with window 150 (FIGS. 3 and 4). As explained above in conjunction with FIGS. 3 and 4, a request is generated by either a user selection of Sort Natural option 193 (FIG. 4) and a corresponding selection such as Calendar option 194 (FIG. 4) or by an activation of NOSS button 172 (FIGS. 3 and 4).

During a "Parse Request" block 256, process 250 analyzes the information received in the request received during block 254 (see block 144, FIG. 2) by breaking the request into understandable components. Once the information has been analyzed, process 250 proceeds to a "Correlate Request" block 258 during which process 250 associates a particular directory identified in the request with information stored in configuration data 134 (FIGS. 1 and 2) (see element 146. FIG. 2).

During a "Configuration (Config.) Available?" block 260, process 250 determines whether or not a directory identified during block 258 is associated with specific configuration data 134. If not, process 250 proceeds to an "Artificial Intelligence Module (AIM) Available?" block 262. If so, process 250 proceeds to an "Apply AIM" block 264 by executing logic associated with AIM 149 (FIG. 2) to apply commonly any available artificial intelligent techniques correlating a natural order to sort the files 181-186.

For example, the user may not specify a particular natural ordering scheme, such as Calendar 194, but may rather rely upon AIM 149 to determine an appropriate natural order. For example, logic associated with AIM 149 of NOSS 134 parses a list of files name 181-186 to determine that the ".xls" extension indicates that the associated files 121-126 are accounting files. Further processing determines that the first three letters in each file name correspond to months of the year and sorts the file names in a manner consistent with the context, i.e. accounting files, and information implicit in the file names, i.e. the months of the year. Another example is a list of military ranks transmitted to NOSS 134. The list of ranks is transmitted to NOSS 134, AIM 149 determines that the list is in fact military ranks, sorts the list accordingly and transmits the sorted list to the requester. It should be noted that, although the examples describe the sorting of file names, many types of information may be processed in accordance with the claimed subject matter, including, but not limited to, lists that include icons, file names and data elements.

If, during block 262, process 250 determines either that NOSS 134 doesn't include AIM 149 or available techniques do not apply to the particular request, control proceeds to a "Transmit Notice" block 266 during which a message is sent to the user who initiated the request to inform the user that configuration data is not available for the requested directory. Control then returns to block 254 and processing continues as described above. The user may be then given an opportunity to define configuration data by means of the generation of AI 214 (FIG. 5).

Following block 264 or, if during block 260, process 250 determines that configuration data for the requested directory is available, control proceeds to a "Sort Files" block 268 (see element 148, FIG. 2). During block 268, the list of files identified in the request received during block 254 is sorted according to the techniques specified by configuration data 136 or AIM 149. During a "Generate & Transmit Message" block 270, process 250 creates and transmits a message with a list of sorted files to the source of the message received during block 254.

During a "Redraw Window" block 272, the window 150 that displays files 181-186 receives the message transmitted 270 and redraws the window in accordance with the information received (see FIG. 4). Redraw window 272 may not be executed on the same system as the rest of process 250 unless the request is on the same system. Control proceeds from block 272, if the request originated from the same system, or directly from block 270 if the request originated form a different system, to block 254 during which processing continues as described above.

Finally, process 250 is halted by means of an asynchronous interrupt (AI) 274, which passes control to an "End Operate NOSS" block 279 in which process 250 is complete. Interrupt 270 is typically generated when the OS, browser, application, etc. of which process 250 are a part is itself halted. During nominal operation, process 250 continuously loops through the blocks 254, 256, 258, 260, 262, 264, 266, 268, 270 and 272, processing messages as they are received.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method for displaying information, comprising:
analyzing a list of data items stored on a computing system to determine a context for information corresponding to the data items, wherein metadata is associated with each data item of the list of data items;
correlating the context to information implicit in the list of data items, wherein
the information implicit in the list of data items is not included within the metadata, and
the computing system comprises a plurality of predetermined sorting methods to sort the list of data items based upon said metadata;
dynamically identifying a natural ordering sorting method based upon the context and the information implicit in the list of data items, wherein natural ordering sorting method is not included within the plurality of predetermined sorting methods; and
sorting the list of data items utilizing the natural ordering sorting method to produce a sorted list.

2. The method of claim 1, wherein:
the analyzing, correlating, defining and sorting are performed utilizing a web service associated with a server computing system which is physically remote from the computing system; and
transmitting the sorted list from the web service to the computing system.

3. The method of claim 1, wherein the data items are files stored on the computing system.

4. The method of claim 3, wherein the context for information corresponding to the data items comprises a type of data stored within the files and the implicit information comprises data specifying at least a portion of a name of each of the files.

5. The method of claim 3, the analyzing comprising determining the context based upon a file extension corresponding to the files.

6. The method of claim 3, further comprising:
defining a data field within each of the files;
wherein the information implicit in the list of data items is based upon data stored in the data fields of each of the files.

7. The method of claim 1, further comprising displaying the sorted list on a display of the computing system.

8. A system for displaying information, comprising:
a memory:
a processor coupled to the memory;
logic, stored on the memory for execution on the processor for:
analyzing a list of data items stored on a computing system to determine a context for information corresponding to the data items, wherein metadata is associated with each data item of the list of data items;
correlating the context to information implicit in the list of data items, wherein
the information implicit in the list of data items is not included within the metadata, and
the computing system comprises a plurality of predetermined sorting methods to sort the list of data items based upon said metadata;
dynamically identifying a natural ordering sorting method based upon the context and the information implicit in the list of data items, wherein natural ordering sorting method is not included within the plurality of predetermined sorting methods; and
sorting the list of data items utilizing the natural ordering sorting method to produce a sorted list.

9. The system of claim 8, wherein:
the analyzing, correlating, defining and sorting are performed utilizing a web service associated with a server computing system which is physically remote from the computing system; and
transmitting the sorted list from the web service to the computing system.

10. The system of claim 8. wherein the data items are files stored on the computing system.

11. The system of claim 10, wherein the context for information corresponding to the data items comprises a type of data stored within the files and the implicit information comprises data specifying at least a portion of a name of each of the files.

12. The system of claim 10, the analyzing comprising determining the context based upon a file extension corresponding to the files.

13. The system of claim 10, further comprising:
defining a data field within each of the files;
wherein the information implicit in the list of data items is based upon data stored in the data fields of each of the files.

14. The system of claim 8, further comprising displaying the sorted list on a display of the computing system.

15. A computer programming product for displaying information, comprising:
a memory;
logic, stored on the memory for execution on a processor for:
analyzing a list of data items stored on a computing system to determine a context for information corresponding to the data items, wherein metadata is associated with each data item of the list of data items;
correlating the context to information implicit in the list of data items, wherein
the information implicit in the list of data items is not included within the metadata, and
the computing system comprises a plurality of predetermined sorting methods to sort the list of data items based upon said metadata;

dynamically identifying a natural ordering sorting method based upon the context and the information implicit in the list of data items, wherein natural ordering sorting method is not included within the plurality of predetermined sorting methods; and sorting the list of data items utilizing the natural ordering sorting method to produce a sorted list.

16. The computer programming product of claim 15, wherein:

the analyzing, correlating, defining and sorting are performed utilizing a web service associated with a server computing system which is physically remote from the computing system; and transmitting the sorted list from the web service to the computing system.

17. The computer programming product of claim 15, wherein the data items are files stored on the computing system.

18. The computer programming product of claim 17, wherein the context for information corresponding to the data items comprises a type of data stored within the files and the implicit information comprises data specifying at least a portion of a name of each of the files.

19. The computer programming product of claim 17, the analyzing comprising determining the context based upon a file extension corresponding to the files.

20. The computer programming product of claim 15, further comprising displaying the sorted list on a display of the computing system.

* * * * *